United States Patent
Sugiyama et al.

(10) Patent No.: US 10,317,890 B2
(45) Date of Patent: Jun. 11, 2019

(54) FAILURE DETECTION APPARATUS FOR SUBSTRATE PROCESSING APPARATUS, AND SUBSTRATE PROCESSING APPARATUS

(71) Applicant: EBARA CORPORATION, Tokyo (JP)

(72) Inventors: Mitsunori Sugiyama, Tokyo (JP); Masafumi Inoue, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 999 days.

(21) Appl. No.: 14/597,214

(22) Filed: Jan. 14, 2015

(65) Prior Publication Data
US 2015/0198947 A1 Jul. 16, 2015

(30) Foreign Application Priority Data
Jan. 15, 2014 (JP) .................... 2014-005166

(51) Int. Cl.
*G05B 23/02* (2006.01)
*G05B 19/418* (2006.01)

(52) U.S. Cl.
CPC ...... *G05B 19/41875* (2013.01); *G05B 23/0235* (2013.01); *G05B 2219/31443* (2013.01); *G05B 2219/45031* (2013.01)

(58) Field of Classification Search
CPC .......... G05B 19/41875; G05B 23/0235; G05B 2219/31443
USPC .................................................. 700/90–116
See application file for complete search history.

(56) References Cited

U.S. PATENT DOCUMENTS

| | | | | |
|---|---|---|---|---|
| 5,606,251 A | * | 2/1997 | Ryle | H01L 21/67046 198/502.1 |
| 5,663,797 A | * | 9/1997 | Sandhu | B24B 37/013 257/E21.528 |
| 5,727,332 A | * | 3/1998 | Thrasher | B08B 1/02 34/277 |
| 5,745,946 A | * | 5/1998 | Thrasher | B08B 17/00 134/200 |
| 6,629,009 B1 | * | 9/2003 | Tamaki | G05B 19/41875 700/108 |

(Continued)

FOREIGN PATENT DOCUMENTS

| | | |
|---|---|---|
| JP | 08-145300 A | 6/1996 |
| JP | 2011-143537 | 7/2011 |

OTHER PUBLICATIONS

Taylor, Nicholas E., and Zachary G. Ives. "Reliable storage and querying for collaborative data sharing systems." Data Engineering (ICDE), 2010 IEEE 26th International Conference on. IEEE, 2010. pp. 40-51.*

(Continued)

*Primary Examiner* — Satish Rampuria
(74) *Attorney, Agent, or Firm* — Baker & Hostetler LLP (57) ABSTRACT

The present invention improves the accuracy of detecting abnormality in a substrate processing apparatus. A failure detection apparatus 520 is provided with a data acquisition part 522 used to collect data detected by sensors 270-1 to 270-a, 370-1 to 370-b and 470-1 to 470-c disposed in a CMP apparatus. In addition, the failure detection apparatus 520 is provided with a determination part 524 used to read recipe data from a recipe storage part 512, to compare the recipe data thus read with the data collected by a data acquisition part 522, thereby determining that abnormality is present in the CMP apparatus if the two data items differ.

18 Claims, 8 Drawing Sheets

(56) References Cited

U.S. PATENT DOCUMENTS 7,400,934 B2 * 7/2008 Birang ................ B24B 37/013
700/121
2003/0229410 A1 * 12/2003 Smith ................ G06F 17/5068
700/109

OTHER PUBLICATIONS

Chang, Fay, et al. "Bigtable: A distributed storage system for structured data." ACM Transactions on Computer Systems (TOCS) 26.2 (2008): 4. pp. 4-4:26.*
Kadlec, Petr, Bogdan Gabrys, and Sibylle Strandt. "Data-driven soft sensors in the process industry." Computers & Chemical Engineering 33.4 (2009): pp. 795-814.*

* cited by examiner

RECIPE DATA

|  | STEP | | | | |
| --- | --- | --- | --- | --- | --- |
|  | 1 | 2 | 3 | 4 | ... |
| TIME | 5 | 10 | 15 | ... | ... |
| ⋮ | | | | | |
| FLOW RATE (mL/sec) | 50 | 100 | 200 | ... | ... |
| TORQUE | ... | ... | ... | ... | ... |
| NO. OF REVOLUTIONS | ... | ... | ... | ... | ... |

↕

RESTORED RECIPE DATA

|  | STEP | | | | |
| --- | --- | --- | --- | --- | --- |
|  | 1 | 2 | 3 | 4 | ... |
| TIME | 5 | 10 | 15 | ... | ... |
| ⋮ | | | | | |
| FLOW RATE (mL/sec) | 48 | 101 | 2 | ... | ... |
| TORQUE | ... | ... | ... | ... | ... |
| NO. OF REVOLUTIONS | ... | ... | ... | ... | ... |

FIG. 6

CONVERTED RECIPE DATA

|  | STEP | | | | |
|---|---|---|---|---|---|
|  | 1 | 2 | 3 | 4 | ... |
| TIME | 5 | 10 | 15 | ... | ... |
| ⋮ | | | | | |
| FLOW RATE (mL/sec) | 70 | 120 | 220 | ... | ... |
| TORQUE | ... | ... | ... | ... | ... |
| NO. OF REVOLUTIONS | ... | ... | ... | ... | ... |

↕

RESTORED RECIPE DATA

|  | STEP | | | | |
|---|---|---|---|---|---|
|  | 1 | 2 | 3 | 4 | ... |
| TIME | 5 | 10 | 15 | ... | ... |
| ⋮ | | | | | |
| FLOW RATE (mL/sec) | 68 |  | 215 | ... | ... |
| TORQUE | ... | ... | ... | ... | ... |
| NO. OF REVOLUTIONS | ... | ... | ... | ... | ... |

FIG. 8

FAILURE DETECTION APPARATUS FOR SUBSTRATE PROCESSING APPARATUS, AND SUBSTRATE PROCESSING APPARATUS

CROSS-REFERENCE TO RELATED APPLICATION

This application is based upon and claims the benefit of priority of the prior Japanese Patent Application No. 2014-005166, filed on Jan. 15, 2014, the entire contents of which are incorporated herein by reference.

TECHNICAL FIELD

The present invention relates to a failure detection apparatus for a substrate processing apparatus, and a substrate processing apparatus.

BACKGROUND ART

In recent years, a substrate processing apparatus is used to perform various treatments on substrates, such as semiconductor wafers. Examples of the substrate processing apparatus include a CMP (Chemical Mechanical Polishing) apparatus for performing polishing treatment on substrates.

The CMP apparatus is provided with, for example, a polishing unit for performing polishing treatment on substrates, a cleaning unit for performing cleaning and drying treatments on substrates, and a load/unload unit for transferring substrates to the polishing unit and receiving substrates cleaning and drying-treated by the cleaning unit. The CMP apparatus is also provided with a transport unit for transporting substrates within the polishing unit, the cleaning unit and the load/unload unit. The CMP apparatus sequentially performs various treatments, including polishing, cleaning and drying, while transporting substrates with the transport unit.

Incidentally, there has been known a technique to detect whether or not abnormality is present in the operation of a substrate processing apparatus, such as a CMP apparatus. For example, recipe data in which procedures or methods related to substrate treatment are defined is stored in a manipulating PC of the substrate processing apparatus. The manipulating PC outputs instructions on substrate treatment based on the recipe data to a sequencer of each unit. The sequencer of each unit controls each component within the unit according to the recipe data output from the manipulating PC, thereby realizing treatment consistent with the recipe data.

Assume here, for example, that the content of recipe data received by the sequencer of a polishing unit from the manipulating PC states "Flow 50 mL of a polishing liquid per unit time." In this case, the sequencer of the polishing unit controls each component within the polishing unit, so that 50 mL of the polishing liquid flows per unit time. A flow rate sensor for the polishing liquid is disposed in the polishing unit to detect the flow rate of the polishing liquid. The sequencer compares the flow rate of the polishing liquid detected by the flow rate sensor with the flow rate (50 mL) of the recipe data. If, as the result of comparison, there is no difference between the flow rates or if the difference is within a preset range of thresholds, the sequencer determines that no abnormality is present in the substrate processing apparatus (polishing unit).

CITATION LIST

Patent Document

Patent document 1: Japanese Patent Laid-Open No. 2011-143537

However, the related art does not take into consideration improving the accuracy of detecting abnormality in the substrate processing apparatus.

For example, if any abnormality, such as a change in the content of recipe data, occurs for some reason in the course of the recipe data being output from the manipulating PC to the sequencer of each unit, it is difficult for a conventional method of abnormality detection to detect this abnormality.

Assume, for example, that the content of recipe data stored in the manipulating PC states, "Flow 60 mL of a polishing liquid per unit time." Also assume that in this case, the content changes and states, "Flow 50 mL of a polishing liquid per unit time," due to some abnormality in the course of the recipe data being output from the manipulating PC to the sequencer of a polishing unit. Then, in the related art, the content of recipe data received by the sequencer is compared with a flow rate detected by a flow rate sensor, as described above, to determine whether or not abnormality is present in the substrate processing apparatus. Accordingly, if the flow rate detected by the flow rate sensor is 50 mL, a determination is made that no abnormality is present. As a result, a determination may be made that no abnormality is present in the operation of the substrate processing apparatus, notwithstanding that 50 mL of the polishing liquid flows actually per unit time whereas 60 mL of the polishing liquid has to be flowed originally per unit time.

Hence, it is an object of the present invention to improve the accuracy of detecting abnormality in a substrate processing apparatus.

SUMMARY OF INVENTION

One embodiment of a failure detection apparatus of the present invention, which has been accomplished in view of the above-described problem, is provided with a data acquisition part configured to collect data detected by a sensor disposed in a substrate processing apparatus; and a determination part configured to read recipe data from a recipe storage part, and determine whether or not abnormality is present in the substrate processing apparatus on the basis of the recipe data thus read and the data collected by the data acquisition part.

In another embodiment of the failure detection apparatus, the determination part can compare the recipe data read from the recipe storage part with the data collected by the data acquisition part, and determine that abnormality is present in the substrate processing apparatus if the two data items differ.

In yet another embodiment of the failure detection apparatus, the determination part can compare the recipe data read from the recipe storage part with the data collected by the data acquisition part, and determine that abnormality is present in the substrate processing apparatus if the difference between the two data items is greater than a preset threshold.

In still another embodiment of the failure detection apparatus, the failure detection apparatus is further provided with a recipe restoration part configured to restore recipe data on the basis of data collected by the data acquisition part, wherein the determination part can compare the recipe data read from the recipe storage part with the restored recipe data restored by the recipe restoration part, and determine that abnormality is present in the substrate processing apparatus if the two data items differ.

In still another embodiment of the failure detection apparatus, the determination part can compare the recipe data read from the recipe storage part with the restored recipe data restored by the recipe restoration part, and determine that abnormality is present in the substrate processing apparatus if the difference between the two data items is greater than a preset threshold.

In still another embodiment of the failure detection apparatus, the failure detection apparatus is further provided with a recipe conversion part configured to read system parameters to be applied to the operation of the substrate processing apparatus from a system parameter storage part in which the system parameters are stored, irrespective of the recipe data stored in the recipe storage part, and convert the recipe data read from the recipe storage part on the basis of the system parameters thus read, wherein the determination part can compare the converted recipe data converted by the recipe conversion part with the data collected by the data acquisition part, and determine that abnormality is present in the substrate processing apparatus if the two data items differ.

In still another embodiment of the failure detection apparatus, the determination part can compare the converted recipe data converted by the recipe conversion part with the data collected by the data acquisition part, and determine that abnormality is present in the substrate processing apparatus if the difference between the two data items is greater than a preset threshold.

In still another embodiment of the failure detection apparatus, the failure detection apparatus is further provided with a recipe restoration part configured to restore recipe data on the basis of data collected by the data acquisition part, and a recipe conversion part configured to read system parameters to be applied to the operation of the substrate processing apparatus from a system parameter storage part in which the system parameters are stored, irrespective of the recipe data stored in the recipe storage part, and convert the recipe data read from the recipe storage part on the basis of the system parameters thus read, wherein the determination part can compare the converted recipe data converted by the recipe conversion part with the recipe data restored by the recipe restoration part, and determine that abnormality is present in the substrate processing apparatus if the two data items differ.

In still another embodiment of the failure detection apparatus, the determination part can compare the converted recipe data converted by the recipe conversion part with the recipe data restored by the recipe restoration part, and determine that abnormality is present in the substrate processing apparatus if the difference between the two data items is greater than a preset threshold.

One embodiment of a substrate processing apparatus of the present invention is provided with one of the above-described failure detection apparatuses; a polishing unit configured to perform polishing treatment on a substrate; a cleaning unit configured to perform cleaning and drying treatments on the substrate; and a load/unload unit configured to transfer the substrate to the polishing unit and receive the substrate cleaning and drying-treated by the cleaning unit.

According to the above-described present invention, it is possible to increase the accuracy of detecting abnormality in a substrate processing apparatus.

DESCRIPTION OF EMBODIMENTS

Hereinafter, a substrate processing apparatus according to one embodiment of the present invention will be described with reference to the accompanying drawings. In the following description, a CMP apparatus will be discussed as one example of the substrate processing apparatus, though the substrate processing apparatus is not limited to this apparatus. In addition, in the following description, a substrate processing apparatus provided with a load/unload unit 2, a polishing unit 3 and a cleaning unit 4 will be discussed, though the substrate processing apparatus is not limited to this apparatus.

The configuration of the CMP apparatus will be described first, and then a description will be made of an improvement in the accuracy of detecting abnormality in the substrate processing apparatus.

<Substrate Processing Apparatus>

Figure 1:
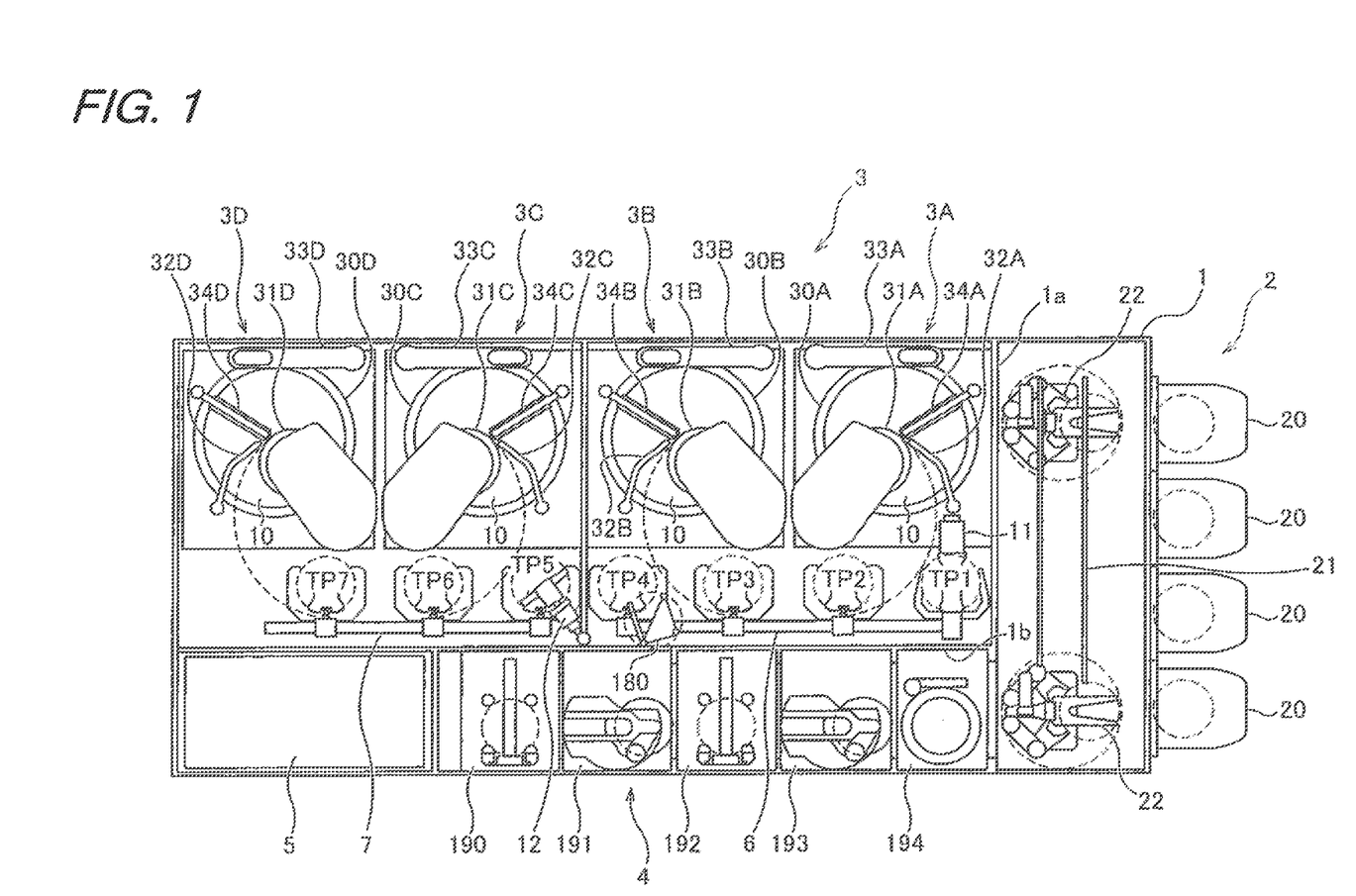
FIG. 1 is a plan view illustrating the overall configuration of a substrate processing apparatus of the present embodiment.

FIG. 1 is a plan view illustrating the overall configuration of a substrate processing apparatus according to one embodiment of the present invention. As illustrated in FIG. 1, this CMP apparatus is provided with a substantially rectangular housing 1. The interior of the housing 1 is partitioned into a load/unload unit 2, a polishing unit 3 and a cleaning unit 4 by bulkheads 1a and 1b. The load/unload unit 2, the polishing unit 3 and the cleaning unit 4 are assembled independent of one another and evacuated separately. The cleaning unit 4 includes a control apparatus 5 used to control substrate treatment actions.

<Load/Unload Unit>

The load/unload unit 2 is provided with two or more (four in the present embodiment) front load parts 20 on which wafer cassettes for containing a multitude of wafers (substrates) are mounted. These front load parts 20 are disposed adjacently to the housing 1 and laid out along the width direction (direction perpendicular to the longitudinal direction) of the substrate processing apparatus. An open cassette, an SMIF (Standard Manufacturing Interface) pod, or a FOUP (Front Opening Unified Pod) can be mounted on each front load part 20. Here, the SMIF and the FOUP are airtight containers capable of maintaining an environment independent of an external space by being covered with bulkheads with wafer cassettes housed in the containers.

A traveling mechanism 21 is laid on the load/unload unit 2 along an array of the front load parts 20. Two transport robots (loader and transport mechanism) 22 movable along the array direction of wafer cassettes are mounted on this traveling mechanism 21. The transport robots 22 travel on the traveling mechanism 21 to be able to gain access to wafer cassettes mounted on the front load parts 20. Each transport robot 22 is provided with two hands on the upper and lower sides thereof. The upper hand is used when a treated wafer is returned to a wafer cassette. The lower hand is used when a wafer before treatment is taken out of a wafer cassette. In this way, each transport robot can selectively use the upper and lower hands. In addition, the lower hand of each transport robot 22 is configured to rotate around the axis thereof to be able to turn over a wafer.

The load/unload unit 2 is an area that needs to be maintained in the cleanest state. Accordingly, the internal pressure of the load/unload unit 2 is constantly kept higher than the external pressure of the CMP apparatus and the internal pressures of the polishing unit 3 and the cleaning unit 4. The polishing unit 3 uses slurry as a polishing liquid and is, therefore, the most unclean area. Accordingly, a negative pressure is formed inside the polishing unit 3 and is kept lower than the internal pressure of the cleaning unit 4. A filter fan unit (not illustrated) including a clean air filter, such as a HEPA filter, an ULPA filter or a chemical filter, is disposed in the load/unload unit 2. Clean air from which particles, toxic vapor and toxic gas have been removed blows out constantly from this filter fan unit.

<Polishing Unit>

The polishing unit 3 is an area where a wafer is polished (planarized). The polishing unit 3 is provided with a first polishing unit 3A, a second polishing unit 3B, a third polishing unit 3C and a fourth polishing unit 3D. These first polishing unit 3A, second polishing unit 3B, third polishing unit 3C and fourth polishing unit 3D are laid out along the longitudinal direction of the substrate processing apparatus, as illustrated in FIG. 1.

As illustrated in FIG. 1, the first polishing unit 3A is provided with a polishing table 30A fitted with an abrasive pad 10 having a polishing surface. The first polishing unit 3A is also provided with a top ring 31A for holding and polishing a wafer, while pressing the wafer against the abrasive pad 10 on the polishing table 30A. The first polishing unit 3A is further provided with a polishing liquid supply nozzle 32A for supplying a polishing liquid and a dressing liquid (for example, pure water) to the abrasive pad 10. The first polishing unit 3A is further provided with a dresser 33A for dressing the polishing surface of the abrasive pad 10. The first polishing unit 3A is further provided with an atomizer 34A for nebulizing and spraying a fluid mixture of a liquid (for example, pure water) and a gas (for example, nitrogen gas) or a liquid (for example, pure water) onto the polishing surface.

Likewise, the second polishing unit 3B is provided with a polishing table 30B fitted with an abrasive pad 10, a top ring 31B, a polishing liquid supply nozzle 32B, a dresser 33B, and an atomizer 34B. The third polishing unit 3C is provided with a polishing table 30C fitted with an abrasive pad 10, a top ring 31C, a polishing liquid supply nozzle 32C, a dresser 33C, and an atomizer 34C. The fourth polishing unit 3D is provided with a polishing table 30D fitted with an abrasive pad 10, a top ring 31D, a polishing liquid supply nozzle 32D, a dresser 33D, and an atomizer 34D.

The first polishing unit 3A, the second polishing unit 3B, the third polishing unit 3C and the fourth polishing unit 3D have the same configuration, and therefore, only the first polishing unit 3A will be described hereinafter.

Figure 2:
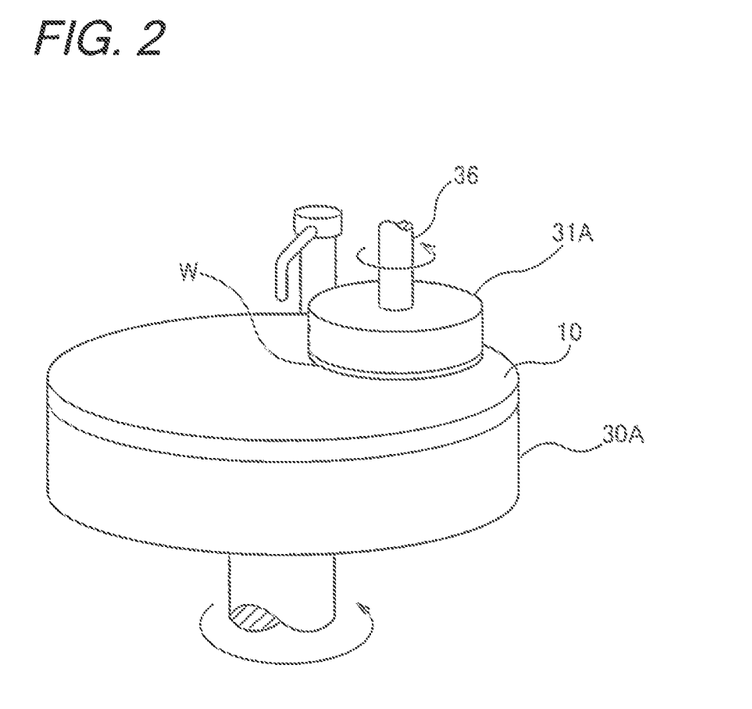
FIG. 2 is a perspective view schematically illustrating a polishing unit.

FIG. 2 is a perspective view schematically illustrating the first polishing unit 3A. The top ring 31A is supported on a top ring shaft 36. The abrasive pad 10 is attached to the upper surface of the polishing table 30A. The upper surface of this abrasive pad 10 forms a polishing surface for polishing a wafer W. Note that fixed abrasive grains may be used in place of the abrasive pad 10. The top ring 31A and the polishing table 30A are configured to rotate around the shaft center thereof, as shown by an arrow. The wafer W is supported onto the lower surface of the top ring 31A by means of vacuum suction. At the time of polishing, a polishing liquid is supplied from the polishing liquid supply nozzle 32A to the polishing surface of the abrasive pad 10. Thus, the wafer W which is an object to be polished is pressed against the polishing surface by the top ring 31A and polished.

Next, a description will be made of a transport mechanism for transporting wafers. As illustrated in FIG. 1, a first linear transporter 6 is disposed adjacently to the first polishing unit 3A and the second polishing unit 3B. This first linear transporter 6 is a mechanism for transporting wafers among four transport positions (defined as a first transport position TP1, a second transport position TP2, a third transport position TP3 and a fourth transport position TP4 in order from the load/unload unit side) along the direction in which the polishing units 3A and 3B are laid out.

Likewise, a second linear transporter 7 is disposed adjacently to the third polishing unit 3C and the fourth polishing unit 3D. This second linear transporter 7 is a mechanism for transporting wafers among three transport positions (defined as a fifth transport position TP5, a sixth transport position TP6 and a seventh transport position TP7 in order from the load/unload unit side) along the direction in which the polishing units 3C and 3D are laid out.

Wafers are transported to the polishing units 3A and 3B by the first linear transporter 6. The top ring 31A of the first polishing unit 3A moves between a polishing position and the second transport position TP2 due to the swinging action of a top ring head. Accordingly, a wafer is transferred to and from the top ring 31A at the second transport position TP2. Likewise, the top ring 31B of the second polishing unit 3B moves between a polishing position and the third transport position TP3. Thus, a wafer is transferred to and from the top ring 31B at the third transport position TP3. The top ring 31C of the third polishing unit 3C moves between a polishing position and the sixth transport position TP6. Thus, a wafer is transferred to and from the top ring 31C at the sixth transport position TP6. The top ring 31D of the fourth polishing unit 3D moves between a polishing position and the seventh transport position TP7. Thus, a wafer is transferred to and from the top ring 31D at the seventh transport position TP7.

A lifter 11 for receiving a wafer from a transport robot 22 is disposed in the first transport position TP1. The wafer is transferred from the transport robot 22 to the first linear transporter 6 by way of this lifter 11. A shutter (not illustrated) is disposed in the bulkhead 1a, so as to locate between the lifter 11 and the transport robot 22. The shutter is opened at the time of transporting the wafer, so that the wafer is transferred from the transport robot 22 to the lifter 11. In addition, a swing transporter 12 is disposed among the first linear transporter 6, the second linear transporter 7 and the cleaning unit 4. This swing transporter 12 includes a hand movable between the fourth transport position TP4 and the fifth transport position TP5. Wafer transfer from the first linear transporter 6 to the second linear transporter 7 is made by the swing transporter 12. A wafer is transported to the third polishing unit 3C and/or the fourth polishing unit 3D by the second linear transporter 7. A wafer polished by the polishing unit 3 is transported to the cleaning unit 4 through the swing transporter 12.

<Cleaning Module>

Figure 3A:
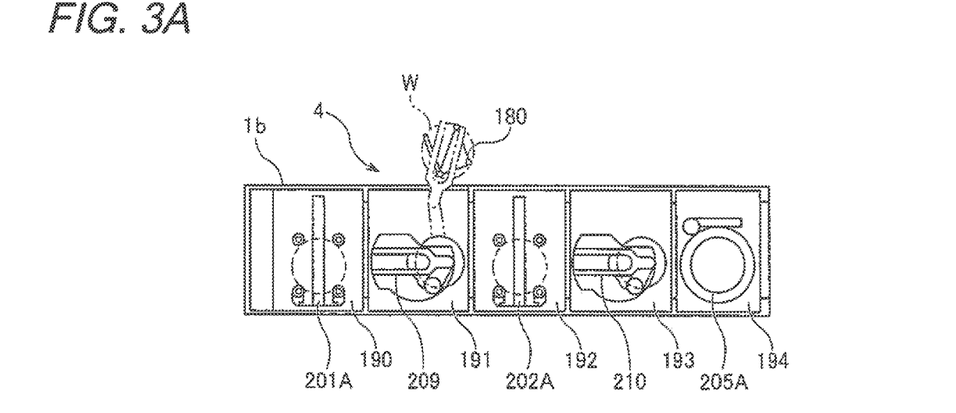
FIG. 3A is a plan view illustrating a cleaning unit.
Figure 3B:
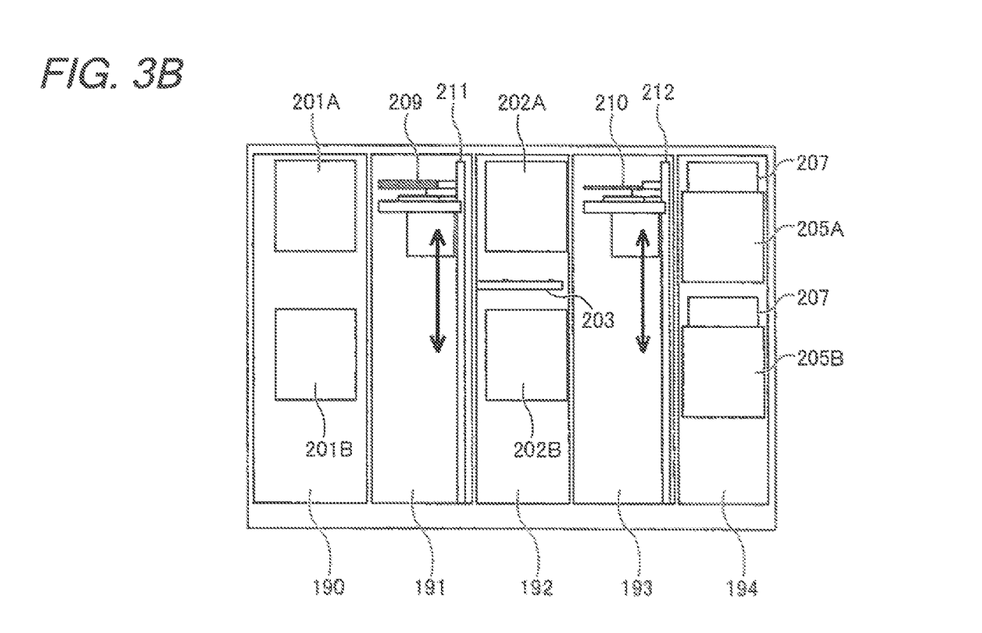
FIG. 3B is a side view illustrating the cleaning unit.

FIG. 3A is a plan view illustrating the cleaning unit 4. FIG. 3B is a side view illustrating the cleaning unit 4. As illustrated in FIGS. 3A and 3B, the cleaning unit 4 is partitioned into a first cleaning chamber 190, a first transport chamber 191, a second cleaning chamber 192, a second transport chamber 193, and a drying chamber 194. An upper primary cleaning module 201A and a lower primary cleaning module 201B laid out along the longitudinal direction of the first cleaning chamber 190 are disposed inside the first cleaning chamber 190. The upper primary cleaning module 201A is disposed above the lower primary cleaning module 201B. Likewise, an upper secondary cleaning module 202A and a lower secondary cleaning module 202B laid out along the longitudinal direction of the second cleaning chamber 192 are disposed inside the second cleaning chamber 192. The upper secondary cleaning module 202A is disposed above the lower secondary cleaning module 202B. The primary and secondary cleaning modules 201A, 201B, 202A and 202B are cleaning machines used to clean wafers with a cleaning liquid. These primary and secondary cleaning modules 201A, 201B, 202A and 202B are laid out along the vertical direction of the cleaning unit 4, and therefore, have the advantage of being small in footprint.

A temporary pedestal 203 for wafers is arranged between the upper secondary cleaning module 202A and the lower secondary cleaning module 202B. An upper drying module 205A and a lower drying module 205B laid out along the longitudinal direction of the drying chamber 194 are disposed inside the drying chamber 194. These upper drying module 205A and lower drying module 205B are segregated from each other. Filter fan units 207, 207 for supplying clean air into the drying modules 205A and 205B are arranged in the upper sections of the upper drying module 205A and the lower drying module 205B. The upper primary cleaning module 201A, the lower primary cleaning module 201B, the upper secondary cleaning module 202A, the lower secondary cleaning module 202B, the temporary pedestal 203, the upper drying module 205A and the lower drying module 205B are fixed on an unillustrated frame through bolts or the like.

An up-and-down movable first transport robot (transport mechanism) 209 is disposed in the first transport chamber 191. An up-and-down movable second transport robot 210 is disposed in the second transport chamber 193. The first transport robot 209 and the second transport robot 210 are movably supported on support shafts 211 and 212, respectively, extending in the longitudinal direction. The first transport robot 209 and the second transport robot 210 include therein drive mechanisms, such as motors, and are movable up and down along the support shafts 211 and 212. Like the transport robot 22, the first transport robot 209 includes two hands, i.e., upper and lower hands. The first transport robot 209 is disposed in a position where the lower hand can gain access to a temporary pedestal 180, as shown by a dotted line in FIG. 3A. When the lower hand of the first transport robot 209 gains access to the temporary pedestal 180, the shutter (not illustrated) disposed in the bulkhead 1b opens.

The first transport robot 209 is operable to transport a wafer W among the temporary pedestal 180, the upper primary cleaning module 201A, the lower primary cleaning module 201B, the temporary pedestal 203, the upper secondary cleaning module 202A and the lower secondary cleaning module 202B. The first transport robot 209 uses the lower hand when transporting a wafer before cleaning (wafer to which slurry adheres), and uses the upper hand when transporting the wafer after cleaning. The second transport robot 210 is operable to transport the wafer W among the upper secondary cleaning module 202A, the lower secondary cleaning module 202B, the temporary pedestal 203, the upper drying module 205A and the lower drying module 205B. The second transport robot 210 transports a cleaned wafer only, and therefore, includes only one hand. Each transport robot 22 illustrated in FIG. 1 uses the upper hand thereof to take out a wafer from the upper drying module 205A or the lower drying module 205B and returns the wafer to a wafer cassette. When the upper hand of the transport robot 22 gains access to the drying modules 205A and 205B, the shutter (not illustrated) disposed in the bulkhead 1a opens.

<Improvement in Accuracy of Detecting Abnormality in CMP Apparatus>

Next, a description will be made of improvement in the accuracy of detecting abnormality in a CMP apparatus.

Figure 4:
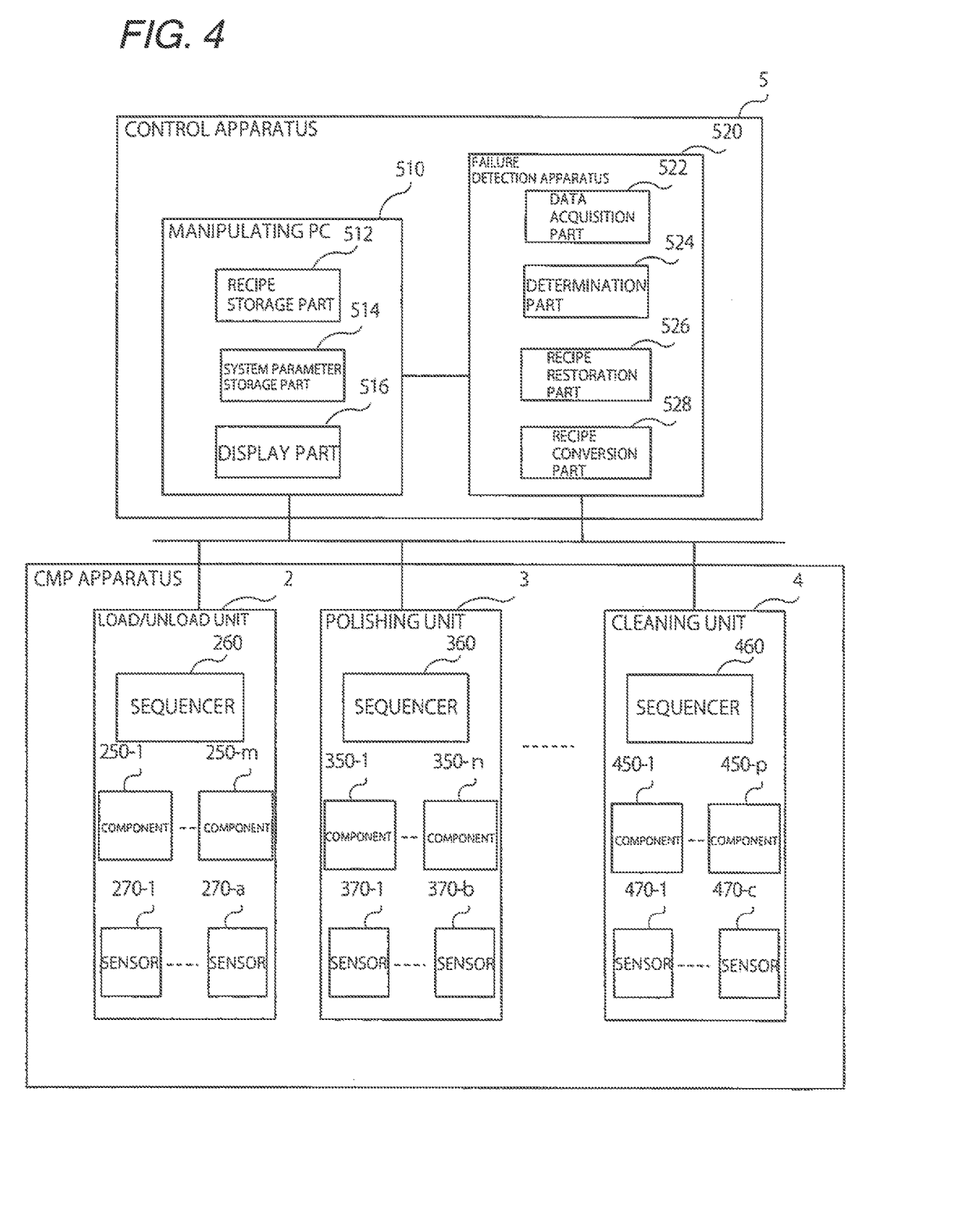
FIG. 4 is a schematic view illustrating the configurations of a failure detection apparatus and a CMP apparatus.

FIG. 4 is a schematic view illustrating the configurations of the failure detection apparatus and the CMP apparatus. As described above, the CMP apparatus includes a plurality of units, such as the load/unload unit 2, the polishing unit 3 and the cleaning unit 4.

A sequencer 260 for controlling the operation of a plurality of components 250-1 to 250-$m$ (transport robot 22 and the like) within the load/unload unit 2 is disposed in the load/unload unit 2. In addition, a plurality of sensors 270-1 to 270-$a$ for detecting data on the control of the load/unload unit 2 is disposed in the load/unload unit 2. The sensors 270-1 to 270-$a$ include, for example, a sensor for detecting whether or not a wafer is placed on the transport robot 22.

A sequencer 360 for controlling the operation of a plurality of components 350-1 to 350-$n$ (polishing table, top ring, and the like) within the polishing unit 3 is disposed in the polishing unit 3. In addition, a plurality of sensors 370-1 to 370-$b$ for detecting data on the control of the polishing unit 3 is disposed in the polishing unit 3. The sensors 370-1 to 370-$b$ include, for example, a sensor for detecting the flow rate of a polishing liquid supplied to the abrasive pad 10, a sensor for detecting the number of revolutions of the polishing table 30, and a sensor for detecting the rotary torque of the polishing table 30 or the top ring 31.

A sequencer 460 for controlling the operation of a plurality of components 450-1 to 450-$p$ (cleaning module, transport robot, and the like) within the cleaning unit 4 is disposed in the cleaning unit 4. In addition, a plurality of sensors 470-1 to 470-$c$ for detecting data on the control of the cleaning unit 4 is disposed in the cleaning unit 4. The sensors 470-1 to 470-$c$ include, for example, a sensor for detecting the flow rate of a cleaning liquid supplied to a wafer.

The control apparatus 5 is connected to the load/unload unit 2 (sequencer 260), the polishing unit 3 (sequencer 360) and the cleaning unit 4 (sequencer 460). The control apparatus 5 is provided with a manipulating PC 510 and a failure detection apparatus 520. Note that in the present embodiment, an example is shown in which the control apparatus 5 is configured with the manipulating PC 510 and the failure detection apparatus 520 as separate equipment. Without limitation to this configuration, however, functions to be described hereinafter may be incorporated in one unit of equipment.

The manipulating PC 510 is provided with a recipe storage part 512, a system parameter storage part 514 and a display part 516.

The recipe storage part 512 is a storage medium where recipe data in which procedures or methods related to the substrate treatment of the CMP apparatus are defined is stored. The system parameter storage part 514 is a storage medium where system parameters to be applied to the operation of the CMP apparatus irrespective of the recipe data stored in the recipe storage part 512 is stored. The display part 516 is an output interface for displaying various types of data.

The failure detection apparatus 520 is provided with a data acquisition part 522, a determination part 524, a recipe restoration part 526 and a recipe conversion part 528.

<Data Acquisition Part>

The data acquisition part 522 collects data detected by sensors disposed in the CMP apparatus. Specifically, the data acquisition part 522 collects data detected by the sensors 270-1 to 270-*a* disposed in the load/unload unit 2, the sensors 370-1 to 370-*b* disposed in the polishing unit 3, and the sensors 470-1 to 470-*c* disposed in the cleaning unit 4.

<Determination Part>

The determination part 524 reads recipe data from the recipe storage part 512 and determines whether or not abnormality is present in the CMP apparatus on the basis of the recipe data thus read and the data collected by the data acquisition part 522. Specifically, the determination part 524 compares the recipe data read from the recipe storage part 512 and the data collected by the data acquisition part 522 to determine that abnormality is present in the CMP apparatus if the two data items differ. More specifically, the determination part 524 compares the recipe data read from the recipe storage part 512 and the data collected by the data acquisition part 522 to determine that abnormality is present in the CMP apparatus if the difference is greater than a preset threshold (for example, 5% of the recipe data read from the recipe storage part 512). Note that items not described in the recipe data can be compared with preset fixed values. In addition, the settings of comparison conditions (for example, thresholds) can be easily changed by describing the settings in an easy-to-edit language, such as a script language.

<Recipe Restoration Part>

The recipe restoration part 526 restores the recipe data on the basis of the data collected by the data acquisition part 522.

Figure 5:
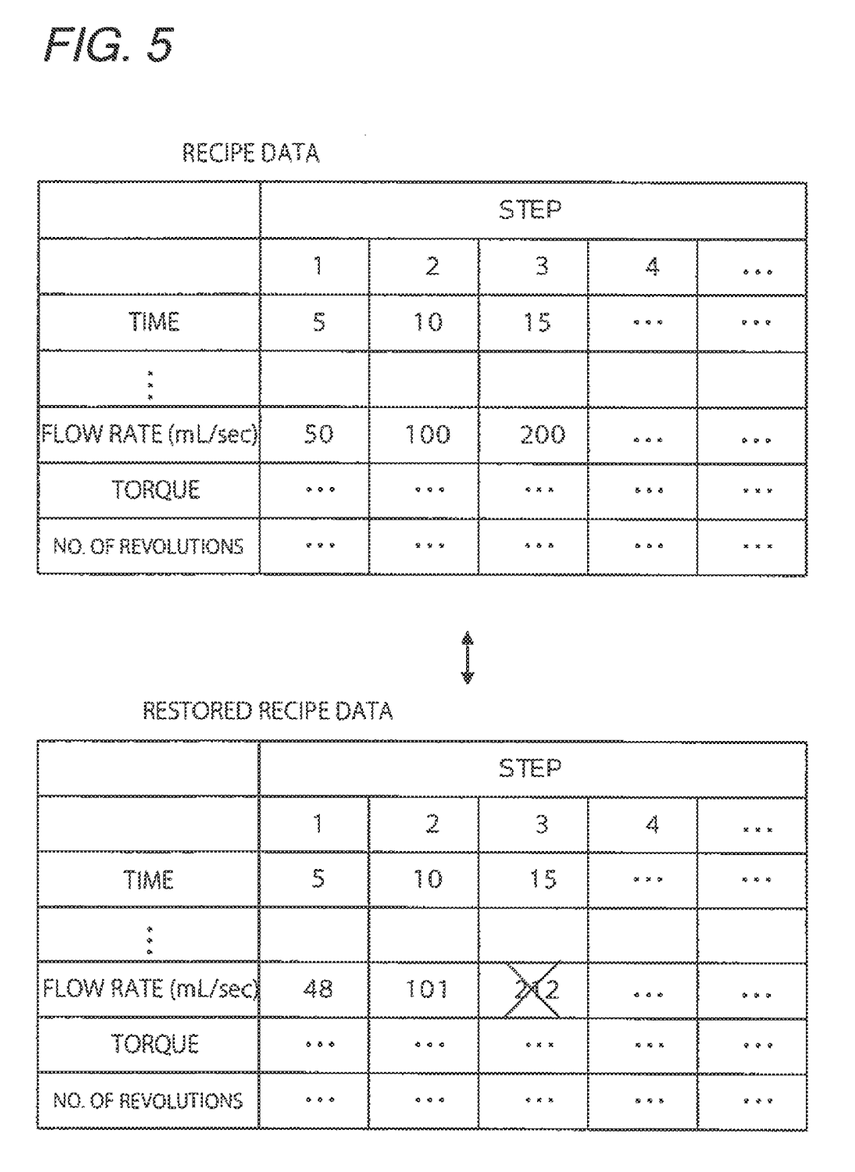
FIG. 5 is a tabular view showing a concept of comparison between recipe data and restored recipe data.

This process will be described using FIG. 5. FIG. 5 is a tabular view showing a concept of comparison between recipe data and restored recipe data. Assume, for example, that original recipe data is composed of a plurality of steps, where a first step instructs to flow 50 mL/sec of a polishing liquid for 5 seconds, a second step instructs to flow 100 mL/sec of the polishing liquid for 10 seconds, and a third step instructs to flow 200 mL/sec of the polishing liquid for 15 seconds.

In this case, the recipe restoration part 526 evaluates an average or peak value of the flow rates of a polishing liquid per unit time (1 sec) during a period of first five seconds from the start of treatment on the basis of a transition in the flow rate of the polishing liquid detected by a flow rate sensor. Then, the recipe restoration part 526 determines the value thus evaluated as the flow rate of the polishing liquid in the first step (48 mL/sec in the example of FIG. 5). In addition, the recipe restoration part 526 evaluates an average or peak value of the flow rates of the polishing liquid per unit time (1 sec) during a period of the next 10 seconds on the basis of a transition in the flow rate of the polishing liquid detected by a flow rate sensor. Then, the recipe restoration part 526 determines the value thus evaluated as the flow rate of the polishing liquid in the second step (101 mL/sec in the example of FIG. 5). Likewise, the recipe restoration part 526 evaluates an average or peak value of the flow rates of the polishing liquid per unit time (1 sec) during a period of the next 15 seconds on the basis of a transition in the flow rate of the polishing liquid detected by a flow rate sensor. Then, the recipe restoration part 526 determines the value thus evaluated as the flow rate of the polishing liquid in the third step (212 mL/sec in the example of FIG. 5).

In a case where the recipe data is restored by the recipe restoration part 526, the determination part 524 compares the recipe data read from the recipe storage part 512 with the restored recipe data restored by the recipe restoration part 526. Then, the determination part determines that abnormality is present in the CMP apparatus if the two data items differ.

Specifically, the determination part 524 compares the recipe data read from the recipe storage part 512 with the restored recipe data restored by the recipe restoration part 526 to determine that abnormality is present in the CMP apparatus if the difference between the two data items is greater than a preset threshold (for example, 5% of the recipe data read from the recipe storage part 512).

In the example of FIG. 5, the determination part 524 determines that for the first step, the difference between the recipe data and the restored recipe data (2 mL/sec) is within 5% of the recipe data (50 mL/sec). In addition, the determination part 524 determines that for the second step, the difference between the recipe data and the restored recipe data (1 mL/sec) is within 5% of the recipe data (100 mL/sec).

In contrast, the determination part 524 determines that for the third step, the difference between the recipe data and the restored recipe data (12 mL/sec) is greater than 5% of the recipe data (200 mL/sec). The determination part 524 determines that abnormality is present in the CMP apparatus if the difference between the recipe data and the restored recipe data is greater than 5% of the recipe data in at least one of the plurality of steps.

<Recipe Conversion Part>

The recipe conversion part 528 reads system parameters from the system parameter storage part 514 and converts recipe data read from the recipe storage part 512 on the basis of the system parameters thus read.

Figure 6:
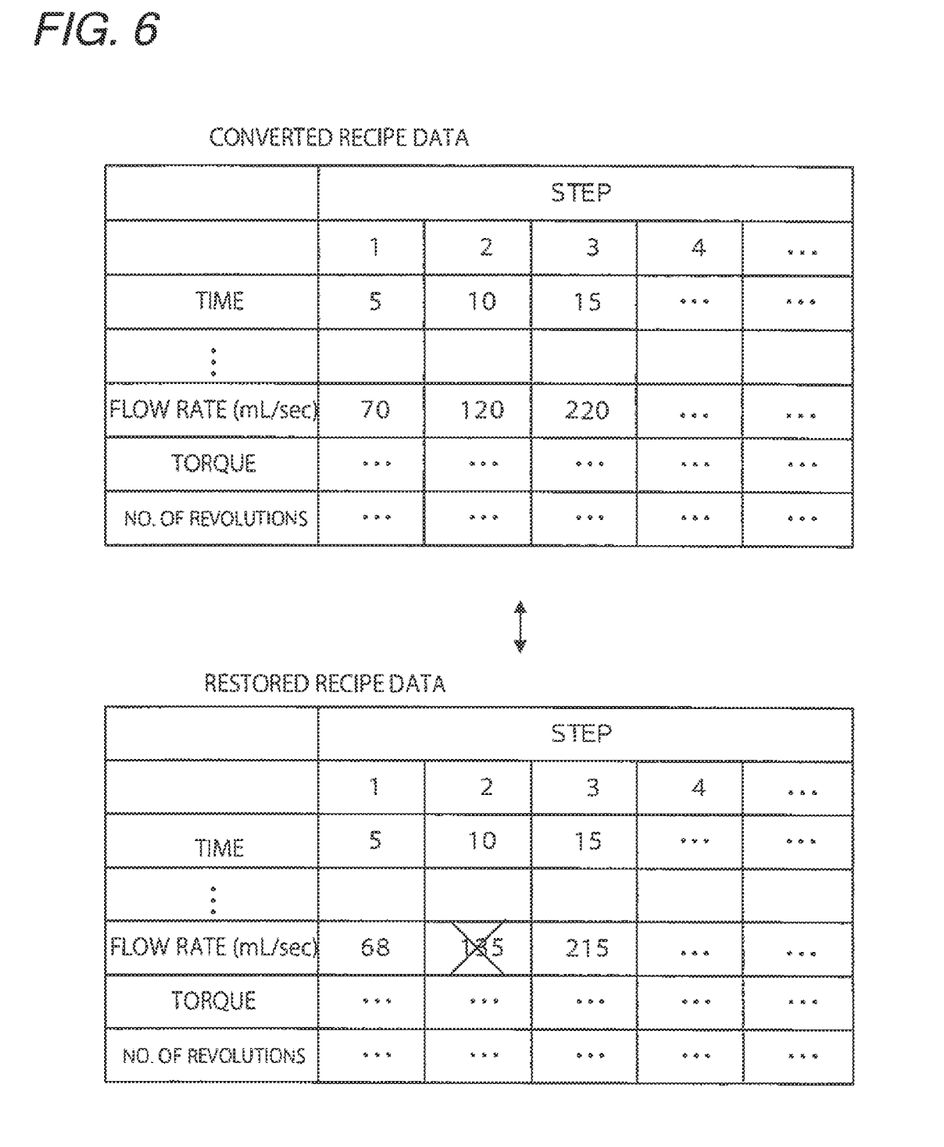
FIG. 6 is a tabular view showing a concept of comparison between converted recipe data and restored recipe data.

This process will be described using FIG. 6. FIG. 6 is a tabular view showing a concept of comparison between converted recipe data and restored recipe data. Assume, for example, that original recipe data is composed of a plurality of steps, where a first step instructs to flow 50 mL/sec of a polishing liquid for 5 seconds, a second step instructs to flow 100 mL/sec of the polishing liquid for 10 seconds, and a third step instructs to flow 200 mL/sec of the polishing liquid for 15 seconds. In addition, the system parameters of the system parameter storage part 514 rule that 70 mL/sec of a polishing liquid is flowed for 5 seconds in the first step, 120 mL/sec of the polishing liquid is flowed for 10 seconds in the second step, and 220 mL/sec of the polishing liquid is flowed for 15 seconds in the third step.

Since the system parameters precede the recipe data in this case, the recipe conversion part 528 rewrites the flow rate of the polishing liquid in the first step of the recipe data to 70 mL/sec, the flow rate of the polishing liquid in the second step to 120 mL/sec, and the flow rate of the polishing liquid in the third step to 220 mL/sec.

If the recipe data is converted by the recipe conversion part 528, the determination part 524 compares the converted recipe data converted by the recipe conversion part 528 with the data collected by the data acquisition part 522. Then, the determination part 524 determines that abnormality is present in the CMP apparatus if the two data items differ.

Specifically, the determination part 524 compares the converted recipe data converted by the recipe conversion part 528 and the data collected by the data acquisition part 522 to determine that abnormality is present in the CMP apparatus if the difference between the two data items is greater than a preset threshold (for example, 5% of the converted recipe data).

In addition, if the recipe data is restored by the recipe restoration part 526 and converted by the recipe conversion part 528, the determination part 524 compares the converted recipe data converted by the recipe conversion part 528 with the recipe data restored by the recipe restoration part 526 to determine that abnormality is present in the CMP apparatus if the two data items differ.

Specifically, the determination part 524 compares the converted recipe data converted by the recipe conversion part 528 with the recipe data restored by the recipe restoration part 526 to determine that abnormality is present in the CMP apparatus if the difference between the two data items is greater than a preset threshold (for example, 5% of the converted recipe data).

In the example of FIG. 6, the determination part 524 determines that for the first step, the difference between the recipe data and the restored recipe data (2 mL/sec) is within 5% of the converted recipe data (70 mL/sec). In addition, the determination part 524 determines that for the third step, the difference between the recipe data and the restored recipe data (5 mL/sec) is within 5% of the converted recipe data (220 mL/sec).

In contrast, the determination part 524 determines that for the second step, the difference between the recipe data and the restored recipe data (15 mL/sec) is greater than 5% of the recipe data (120 mL/sec). The determination part 524 determines that abnormality is present in the CMP apparatus if the difference between the recipe data and the restored recipe data is greater than 5% of the recipe data in at least one of the plurality of steps.

<Process Flow>

Next, a description will be made of the process flow of the failure detection apparatus 520. The failure detection apparatus 520 is adapted for abnormality detection in which some process steps are carried out manually by an operator and for abnormality detection in which treatments are performed automatically.

Figure 7:
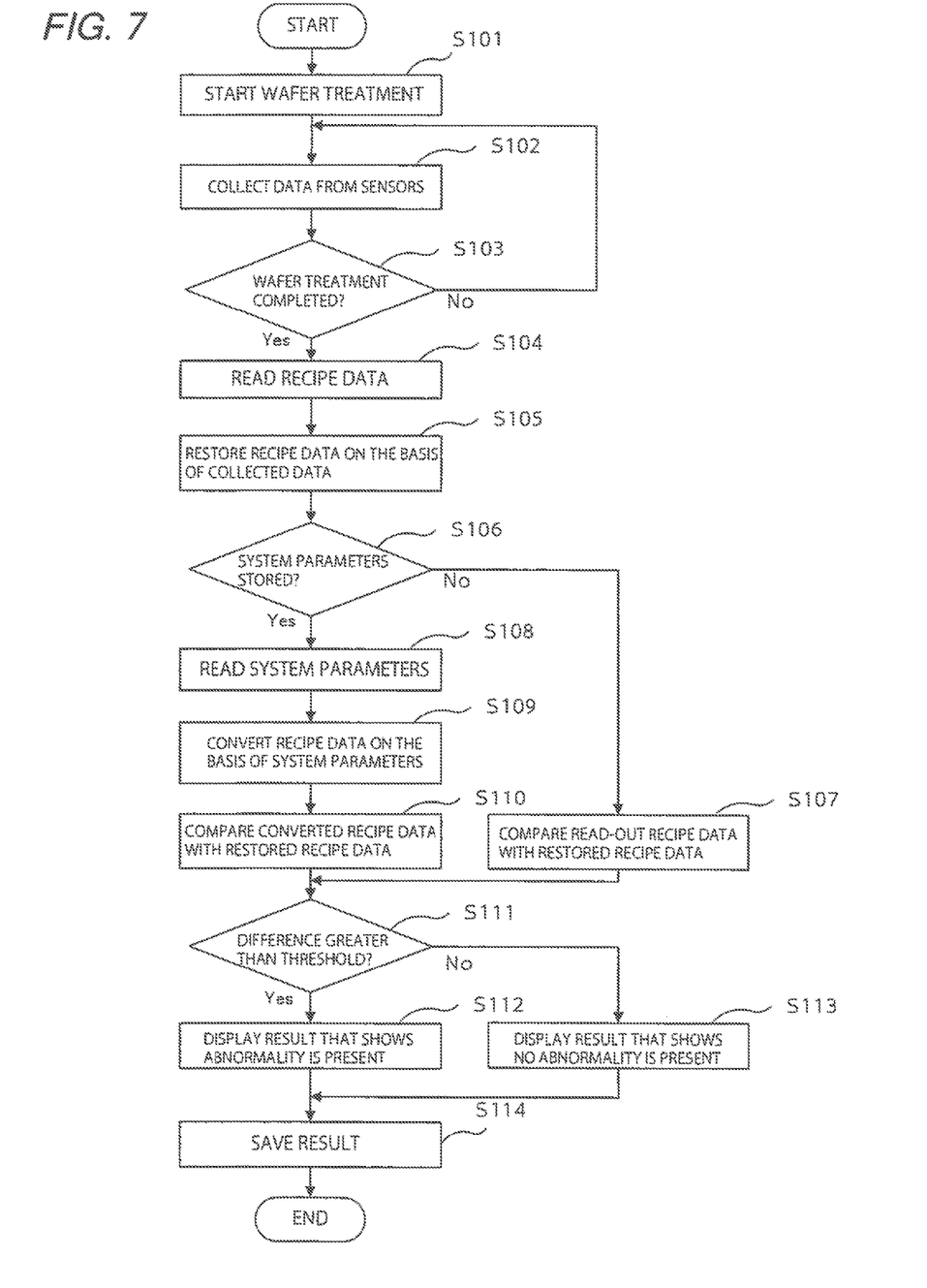
FIG. 7 is a flowchart illustrating a process flow of abnormality detection in which some process steps are manually carried out by an operator.

First, a description will be made of a process flow of abnormality detection in which some process steps are carried out manually by an operator. FIG. 7 is a flowchart illustrating the process flow of abnormality detection in which some process steps are carried out manually by an operator.

First, the data acquisition part 522 collects data detected by a plurality of sensors installed in the CMP apparatus (step S102) when wafer treatment is started (step S101), as illustrated in FIG. 7. The data acquisition part 522 determines whether or not wafer treatment is completed (step S103). If the treatment is not completed (No in step S103), the data acquisition part 522 goes back to step S102 to repeat data collection. Thus, various types of data on the CMP apparatus are collected while wafer treatment is being performed.

Note that wafer treatment is basically performed in line with recipes created by an operator or the like and stored in the recipe storage part 512. If system parameters are stored in the system parameter storage part 514, however, the treatment is performed in line with the system parameters.

When wafer treatment is completed (Yes in step S103), the determination part 524 reads recipe data from the recipe storage part 512 (step S104). If, for example, an instruction to save a file of the recipe data is output by an operator after wafer treatment is completed, the determination part 524 can read the recipe data from the recipe storage part 512 and save the recipe data thus read as one file.

Subsequently, the recipe restoration part 526 restores the recipe data on the basis of the data collected by the data acquisition part 522 (step S105). If, for example, an instruction to save a file of the collected data is output by an operator, the recipe restoration part 526 can save the restored recipe data based on the data collected by the data acquisition part 522 as one file.

Subsequently, the determination part 524 determines whether or not system parameters are stored in the system parameter storage part 514 (step S106). If the determination part 524 determines that system parameters are not stored in the system parameter storage part 514 (No in step S106), the determination part 524 compares the recipe data read from the recipe storage part 512 with the restored recipe data restored by the recipe restoration part 526 (step S107). If, for example, an instruction to perform abnormality detection is output by an operator, the determination part 524 can read a file of recipe data and a file of restored recipe data to compare the two files.

On the other hand, if the determination part 524 determines that system parameters are stored in the system parameter storage part 514 (Yes in step S106), the recipe conversion part 528 reads the system parameters from the system parameter storage part 514 (step S108). If, for example, an instruction to save a file of the system parameters is output by an operator, the recipe conversion part 528 can read the system parameters from the system parameter storage part 514 to save the system parameters thus read as one file.

In addition, the recipe conversion part 528 converts the recipe data on the basis of the system parameters read from the system parameter storage part 514 (step S109). If, for example, an instruction to save a file of the converted recipe data is output by an operator, the recipe conversion part 528 can save the converted recipe data based on the system parameters as one file.

The determination part 524 compares the converted recipe data converted by the recipe conversion part 528 with the restored recipe data restored by the recipe restoration part 526 (step S110). If, for example, an instruction to perform abnormality detection is output by an operator, the determination part 524 can read a file of the converted recipe data and a file of the restored recipe data to compare the two files.

After step S107 or step S110, the determination part 524 determines, as the result of comparison, whether or not the difference between the two data items is greater than a preset threshold (step S111). If the determination part 524 determines that as the result of comparison, the difference between the two data items is greater than a preset threshold (Yes in step S111), the determination part 524 causes a message to the effect that abnormality is present in the operation of the CMP apparatus to be displayed on the display part 516 (step S112).

On the other hand, if the determination part 524 determines that, as the result of comparison, the difference between the two data items is not greater than the preset threshold (No in step S111), the determination part 524 causes a message to the effect that no abnormality is present in the operation of the CMP apparatus to be displayed on the display part 516 (step S113).

After step S112 or step S113, the determination part 524 saves the result of the abnormality detection process in a storage medium disposed in the failure detection apparatus 520 or the like (step S114). If, for example, an instruction to save the result is output by an operator, the determination part 524 saves the result of the abnormality detection process.

As described above, in the process flow of FIG. 7, the abnormality detection process can be executed automatically, though some process steps (for example, steps S104, 105, 107, 108, 109, 110 and 114) are carried out based on manual instructions given by an operator.

Figure 8:
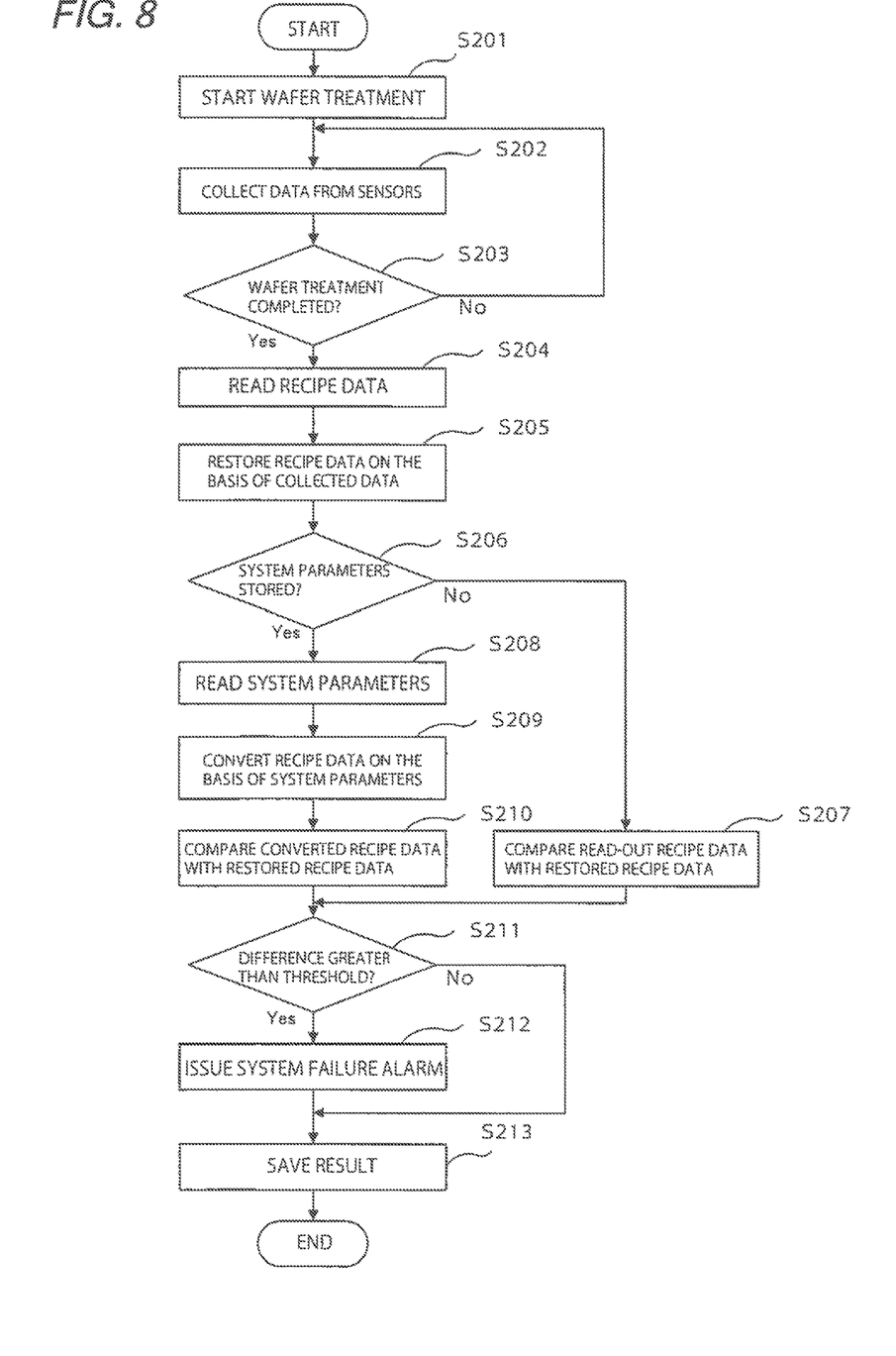
FIG. 8 is a flowchart illustrating a process flow of automatic abnormality detection.

FIG. 8 is a flowchart illustrating a process flow of automatic abnormality detection. Steps S201 to S211 in FIG. 8 correspond to steps S101 to S111 in FIG. 7, and therefore, will be described in no further detail here. Note however that in the process flow of FIG. 8, the failure detection apparatus 520 executes a series of processes in steps S204, 205, 207, 208, 209 and 210 without being given any instructions by an operator.

In addition, if the determination part 524 determines that, as the result of comparison in step 211, the difference between the two data items is greater than a preset threshold (Yes in step S111), the determination part 524 issues a system failure alarm (step S212). For example, the determination part 524 can cause a message to the effect that abnormality is present in the operation of the CMP apparatus to be displayed on the display part 516 and generate a warning sound.

If, after step S212, the determination part 524 determines that, as the result of comparison in step S211, the difference between the two data items is not greater than the preset threshold (No in step S211), the determination part 524 saves the result of the abnormality detection process in a storage medium disposed in the failure detection apparatus 520 or the like (step S213). Note that in the process flow of FIG. 8, step S213 is carried out without being given any instructions by an operator.

According to the present embodiment, it is possible to improve the accuracy of detecting abnormality in the CMP apparatus. That is, in the related art, the content of recipe data received by a sequencer in each unit from the manipulating PC 510 is compared with a flow rate detected by a sensor to determine whether or not abnormality is present in the CMP apparatus. Accordingly, in the related art, it is difficult to correctly detect the abnormal operation of the CMP apparatus if the content of recipe data changes for some reason in the course of the recipe data being output from the manipulating PC 510 to the sequencer of each unit.

Assume, for example, that the content of recipe data stored in the manipulating PC 510 states, "Flow 60 mL of a polishing liquid per unit time." Also assume that in this case, the content changes and states, "Flow 50 mL of the polishing liquid per unit time," due to some abnormality in the course of the recipe data being output from the manipulating PC to the sequencer of a polishing unit. Then, in the related art, the content of recipe data received by the sequencer is compared with a flow rate detected by a flow rate sensor as described above to determine whether or not abnormality is present in the substrate processing apparatus. Accordingly, if the flow rate detected by the flow rate sensor is 50 mL, a determination is made that no abnormality is present. As a result, a determination may be made that no abnormality is present in the operation of the CMP apparatus, notwithstanding that 50 mL of the polishing liquid flows actually per unit time whereas 60 mL of the polishing liquid has to be flowed originally per unit time.

Also in the related art, there has been known a technique in which data when normal wafer treatment is performed (for example, a waveform of the flow rates of a polishing liquid) is saved to compare the saved data with data detected by a sensor by means of, for example, visual observation, thereby detecting abnormality in the operation of the CMP apparatus. In this technique, however, the data when normal wafer treatment is performed needs to be saved each time a recipe is changed. In addition, it takes time and is problematic in terms of accuracy to visually compare, for example, waveforms of the flow rate of a polishing liquid.

In contrast, in the present embodiment, data detected by sensors is collected by the data acquisition part 522 to compare the collected data with recipe data read from the recipe storage part 512, thereby detecting abnormality in the CMP apparatus. Thus, according to the present embodiment, it is possible to precisely detect abnormality in the operation of the CMP apparatus even if the content of recipe data changes for some reason in the course of the recipe data being output from the manipulating PC 510 to the sequencer of each unit.

Assume, for example, that the content of recipe data stored in the recipe storage part 512 states, "Flow 60 mL of a polishing liquid per unit time." Also assume that in this case, the content changes and states, "Flow 50 mL of the polishing liquid per unit time," due to some abnormality in the course of the recipe data being output from the manipulating PC to the sequencer of a polishing unit. Then, in the present embodiment, it is possible to detect abnormality in the operation of the CMP apparatus if the flow rate detected by a flow rate sensor is 50 mL, since recipe data (60 mL) read from the recipe storage part 512 is compared with the flow rate detected by the flow rate sensor (50 mL).

Also according to the present embodiment, there is no need to save data when normal wafer treatment is performed each time a recipe is changed. In addition, since numeric values of, for example, flow rates of a polishing liquid are compared with each other by an apparatus, it is possible to improve the accuracy of detecting abnormality in the CMP apparatus.

REFERENCE SIGNS LIST

270: Sensor
370: Sensor
470: Sensor
512: Recipe storage part
514: System parameter storage part
516: Display part
520: Failure detection apparatus
522: Data acquisition part
524: Determination part
526: Recipe restoration part
528: Recipe conversion part
510: Manipulating PC

What is claimed is:

1. A substrate processing apparatus comprising:
   a process unit for processing a substrate, the process unit including a sensor for detecting a data relating to an operation of the process unit; and
   a control apparatus comprising:

a storage medium and at least one processor, the storage medium storing recipe data in which procedures or methods related to a process performed on the substrate by the substrate processing apparatus are defined, and storing system parameters of the substrate processing apparatus, the system parameters defining parameters applied to the substrate processing apparatus irrespective of the recipe data;

the at least one processor, upon execution of one or more computer readable instructions stored on the storage medium, causing the substrate processing apparatus at least to:

collect data detected by the sensor;

read recipe data from the storage medium;

read system parameters from the storage medium, and convert the recipe data read from the storage medium on the basis of the system parameters; and automatically determining by the at least one processor that an abnormality is present in the substrate processing apparatus by determining that the converted recipe data and the collected data differ.

2. The substrate processing apparatus according to claim 1, wherein determining that an abnormality is present in the substrate processing apparatus by determining that the recipe data and the collected data differ comprises determining that the difference is greater than a preset threshold.

3. The substrate processing apparatus according to claim 1, wherein the at least one processor, upon execution of one or more computer readable instructions stored on the storage medium, further causes the substrate processing apparatus at least to restore recipe data on the basis of data collected determine that an abnormality is present in the substrate processing apparatus by determining that the recipe data read from the storage medium and the restored recipe data differ.

4. The a substrate processing apparatus according to claim 3, wherein determining that an abnormality is present in the substrate processing apparatus by determining that the converted recipe data and the collected data differ comprises determining that the difference is greater than a preset threshold is greater than a preset threshold.

5. The substrate processing apparatus according to claim 1, wherein determining that an abnormality is present in the substrate processing apparatus by determining that the converted recipe data and the collected data differ comprises determining that the difference is greater than a preset threshold.

6. A substrate processing apparatus comprising:

a polishing unit comprising:

a top ring for holding a substrate;

a polishing pad for polishing the substrate by rotating the polishing pad on the substrate held by the top ring; and a sensor for detecting a data relating to an operation of the polishing unit;

a storage medium and a processor, the storage medium storing recipe data in which procedures or methods related to a process performed on the substrate by the substrate processing apparatus are defined, and storing system parameters of the substrate processing apparatus, the system parameters defining parameters applied to the substrate processing apparatus irrespective of the recipe data;

the processor configured at least to:

collect data detected by the sensor;

read recipe data from the storage medium, and determining whether or not an abnormality is present in the substrate processing apparatus on the basis of the recipe data and the data collected; and read system parameters form the storage medium, and convert the recipe data read from the storage medium on the basis of the system parameters, wherein the determination compares the converted recipe data with the collected data acquisition, and provided information that an abnormality is present in the substrate processing apparatus if the two data items differ.

7. A substrate processing apparatus comprising:

an unit for processing a substrate, the unit including a sensor for detecting data relating to an operation of the unit; and a control apparatus comprising:

at least one storage medium having stored thereon recipe data, in which procedures or methods related to a process performed on the substrate by the substrate processing apparatus are defined, and system parameters of the substrate processing apparatus, the system parameters defining parameters applied to the substrate processing apparatus irrespective of the recipe data;

a processor in communication with the at least one storage medium, upon execution of computer readable instruction by the processor, causing the system at least to:

collect data detected by the sensor; read recipe data from the storage medium, and provide information indicative of an abnormality in the substrate processing apparatus based at least in part on the recipe data and the collected data;

restore recipe data based at least in part on the collected data; and read system parameters from the storage medium, and convert the recipe data read from the storage medium based at least in part on the system parameters, wherein providing information indicative of an abnormality in the substrate processing apparatus comprises determining by the processor that the converted recipe data differs from the restored recipe data.

8. The substrate processing apparatus according to claim 7, wherein the determining that the converted recipe data differs from the restored recipe data comprises determining that the difference between the two data items is greater than a preset threshold.

9. The substrate processing apparatus according to claim 7, wherein the determination compares the recipe data read from the storage medium with the restored recipe data, and determines that abnormality is present in the substrate processing apparatus if the two data items differ.

10. The substrate processing apparatus according to claim 9, wherein the determination compares the recipe data read from the storage medium with the restored recipe data, and determines that abnormality is present in the substrate processing apparatus if the difference between the two data items is greater than a preset threshold.

11. The substrate processing apparatus according to claim 7, wherein the determination compares the converted recipe data with the collected data, and determines that an abnormality is present in the substrate processing apparatus if the difference between the two data items is greater than a preset threshold.

12. The substrate processing apparatus according to claim 7, wherein providing information indicative of an abnormality in the substrate processing apparatus comprises determining that the difference between the recipe data and the collect data detected by the sensor is greater than a preset threshold.

13. The substrate processing apparatus according to claim 7, wherein the sensor comprises a flow rate sensor configured to detect a flow rate of a polishing liquid, the recipe data includes a flow rate of a polishing liquid, and wherein providing information indicative of an abnormality in the substrate processing apparatus comprise determining that the difference between the flow rate detected by the flow rate sensor and the flow rate of recipe data is greater than a preset threshold.

14. A substrate processing apparatus comprising:

a process unit for processing the substrate, the process unit including a sensor for detecting a data relating to an operation of the process unit; and a control apparatus comprising a storage medium and a processor, the storage medium configured to store recipe data in which procedures or methods related to a process performed on the substrate by the substrate processing apparatus are defined, and configured to store system parameters of the substrate processing apparatus, the system parameters defining parameters applied to the substrate processing apparatus irrespective of the recipe data;

wherein the control apparatus is configured to execute the steps of:

collecting data detected by the sensor;
reading recipe data from the storage medium;
reading system parameters form the storage medium;
converting the recipe data read from the storage medium on the basis of the system parameters; and
comparing the converted recipe data with the collected data and determining that abnormality is present in the substrate processing apparatus if the two data items differ.

15. The substrate processing apparatus according to claim 14, further comprising the step of: comparing the recipe data read from the storage medium with the collected data and determining that abnormality is present in the substrate processing apparatus if the difference between the two data items is greater than a preset threshold.

16. The substrate processing apparatus according to claim 14, further comprising the steps of:

restoring recipe data on the basis of the collected data, and
comparing the recipe data read from the storage medium with the restored recipe data and determining that abnormality is present in the substrate processing apparatus if the two data items differ.

17. The substrate processing apparatus according to claim 16, further comprising the step of comparing the recipe data read from the storage medium with the restored recipe data and determining that abnormality is present in the substrate processing apparatus if the difference between the two data items is greater than a preset threshold.

18. The substrate processing apparatus according to claim 14, further comprising the step of comparing the converted recipe data with the collected data, and determining that abnormality is present in the substrate processing apparatus if the difference between the two data items is greater than a preset threshold.

* * * * *